(12) United States Patent
D'Arcy et al.

(10) Patent No.: US 11,859,850 B2
(45) Date of Patent: Jan. 2, 2024

(54) HEAT EXCHANGER

(71) Applicant: Heat-Pipe Technology, Inc., Tampa, FL (US)

(72) Inventors: Marcus D'Arcy, Spring Hill, FL (US); Onieluan Tamunobere, Tampa, FL (US)

(73) Assignee: Heat-Pipe Technology, Inc., Tampa, FL (US)

( * ) Notice: Subject to any disclaimer, the term of this patent is extended or adjusted under 35 U.S.C. 154(b) by 0 days.

(21) Appl. No.: 17/717,453

(22) Filed: Apr. 11, 2022

(65) Prior Publication Data

US 2022/0235962 A1 Jul. 28, 2022

Related U.S. Application Data

(62) Division of application No. 15/952,758, filed on Apr. 13, 2018, now Pat. No. 11,300,314.

(51) Int. Cl.
*F24F 12/00* (2006.01)
*F24F 13/15* (2006.01)

(52) U.S. Cl.
CPC ............ *F24F 12/002* (2013.01); *F24F 13/15* (2013.01); *F24F 2012/005* (2013.01)

(58) Field of Classification Search
CPC .... F24F 12/002; F24F 13/15; F24F 2012/005; F28D 1/05316; F28D 15/0266;
(Continued)

(56) References Cited

U.S. PATENT DOCUMENTS 3,926,249 A 12/1975 Glancy
4,190,102 A 2/1980 Gerz
(Continued)

FOREIGN PATENT DOCUMENTS

| JP | S56110886 A | 9/1981 |
| JP | S60251334 A | 12/1985 |
| JP | S61165549 A | 7/1986 |

OTHER PUBLICATIONS

Innergy Tech, Inc., Controllable Heat Pipes, the Easy Way, Innergy tech technical library, document HP-T5.0_A, 2008, p. 1, Canada.

*Primary Examiner* — Tho V Duong
(74) *Attorney, Agent, or Firm* — Arnold & Porter Kaye Scholer LLP (57) ABSTRACT

A heat exchanger for exchanging heat between first and second duct portions of a ventilation system includes first and second heat pipe portions in the first and second duct portions, respectively. Each heat pipe portion can be a heat pipe subassembly including one or more vertical heat pipes fluidly coupled to top and bottom headers, which are respectively connected to the top and bottom headers of the other subassembly to form a refrigerant loop. One or more flow restrictors can block air flow through a respective section of the first or second duct portion. The blocked section can be operatively aligned with a segment of the respective heat pipe portion along which there is a low probability of refrigerant phase change. Each flow restrictor can be an adjustable damper. The damper(s) can be selectively opened and closed as the ventilation system switches between heating and cooling modes.

4 Claims, 5 Drawing Sheets

(58) Field of Classification Search
CPC ....... F28D 15/06; F28F 27/02; F28F 2250/00; Y02B 30/56
USPC .......................................................... 165/4
See application file for complete search history.

(56) References Cited

U.S. PATENT DOCUMENTS

| | | | |
|---|---|---|---|
| 4,226,282 A * | 10/1980 | Kunsagi | F28D 15/0275 165/110 |
| 4,299,272 A | 11/1981 | Del Bagno, Sr. | |
| 4,333,517 A | 6/1982 | Parro | |
| 4,827,733 A * | 5/1989 | Dinh | F24F 6/02 62/196.3 |
| 4,938,035 A | 7/1990 | Dinh | |
| 5,003,961 A * | 4/1991 | Besik | F24F 3/147 165/4 |
| 5,265,433 A | 11/1993 | Beckwith | |
| 5,346,127 A | 9/1994 | Creighton | |
| 5,632,675 A * | 5/1997 | Kanninen | F24F 3/044 454/263 |
| 5,695,004 A | 12/1997 | Beckwith | |
| 5,826,443 A * | 10/1998 | Ares | F25B 6/00 62/324.1 |
| 6,684,649 B1 * | 2/2004 | Thompson | F24F 3/1423 62/93 |
| 6,745,830 B2 | 6/2004 | Dinh | |
| 8,033,322 B1 | 10/2011 | Trent | |
| 9,664,409 B2 | 5/2017 | Marak et al. | |
| 9,702,634 B1 | 7/2017 | Mankaruse | |
| 9,772,124 B2 | 9/2017 | Wintemute et al. | |
| 10,473,343 B2 | 11/2019 | Goel | |
| 2012/0186787 A1 | 7/2012 | Dinh | |
| 2012/0298334 A1 * | 11/2012 | Madaffari | H05K 7/20745 165/96 |
| 2015/0168985 A1 | 6/2015 | Du et al. | |
| 2016/0201937 A1 | 7/2016 | Park | |

* cited by examiner

HEAT EXCHANGER

CROSS-REFERENCE TO RELATED APPLICATION DATA

This application is a division of U.S. patent application Ser. No. 15/952,758, filed Apr. 13, 2018, titled HEAT EXCHANGER, the disclosure of which is incorporated herein in its entirety.

FIELD

This disclosure generally relates to a heat exchanger that provides heat recovery in a climate control system.

BACKGROUND

Heat exchangers can be used in climate control systems to transfer heat between warm and cool air streams flowing through different ducts of the system. For example, a heat exchanger can be used to transfer heat between an exhaust air stream flowing through an exhaust air duct and a supply air stream (e.g., return air and/or outside air) flowing through a supply air duct. This concept is generally referred to as heat recovery. The exhaust air stream and supply air stream will typically be at different temperatures. For example, when a climate control system is being used for heating a building, the exhaust air stream will be relatively warm and the supply air stream will be relatively cool. In this situation, a heat exchanger can be used to transfer heat from the exhaust air stream to the supply air stream to heat the supply air stream before it is fully heated by a heater. In this way, heat is recovered from the warm exhaust air and used to warm the incoming supply air. Conversely, when a ventilation system is used for cooling a building, the exhaust air stream will be relatively cool and the supply air stream will be relatively warm. In this situation, the heat exchanger can be used to transfer heat from the supply air stream to the exhaust air stream to cool the supply air stream before it is further cooled by an air conditioner. In this way, heat is moved from the incoming supply air stream to the exhaust air stream to pre-cool the incoming supply air stream. Some ventilation systems are used for both heating and cooling a building over the course of a year.

SUMMARY

In one aspect, a heat exchanger for exchanging heat between first and second duct portions of a ventilation system comprises a heat pipe system comprising a refrigerant. The heat pipe system includes a first heat pipe portion and a second heat pipe portion that is configured to be fluidly connected to the first heat pipe portion such that the refrigerant can flow through the heat pipe system between the first heat pipe portion and the second heat pipe portion. The first heat pipe portion is configured to be installed in the ventilation system inside the first duct portion such that heat is transferrable between the first heat pipe portion and air flowing through the first duct portion. The second heat pipe portion is configured to be installed in the ventilation system such that heat is transferrable between the second heat pipe portion and air flowing through the second duct portion. A flow restrictor is configured to be installed in the ventilation system inside the first duct portion. The flow restrictor is configured to substantially restrict the air flowing through the first duct portion from flowing through a first section of the first duct portion and allow passage of the air flowing through the first duct portion through a second section of the first duct portion. Wherein the first heat pipe portion is received in both the first section of the first duct portion and the second section of the first duct portion.

In another aspect, a method of recovering heat in a ventilation system having a supply duct and an exhaust duct comprises operating the ventilation system in a cooling mode. While operating the ventilation in the cooling mode, at least one step is performed from a group of cooling mode steps consisting of: arranging a top supply restrictor to restrict a supply air stream in the supply duct from flowing through a top section of the supply duct in which a top segment of a supply heat pipe portion of a heat exchanger is received; arranging a bottom exhaust restrictor to restrict an exhaust air stream in the exhaust duct from flowing through a bottom section of the exhaust duct in which a bottom segment of an exhaust heat pipe portion of the heat exchanger is received; arranging a bottom supply restrictor to permit the supply air stream to flow through a bottom section of the supply duct in which a bottom segment of the supply heat pipe portion is received; and arranging a top exhaust restrictor to permit the exhaust air stream to flow through a top section of the exhaust duct in which a top segment of the exhaust heat pipe portion is received. The ventilation system is operated in a heating mode. While operating the ventilation system in heating mode, at least one step is performed from a group of heating mode steps consisting of: arranging the top supply restrictor to permit the supply air stream to flow through the top section of the supply duct; arranging the bottom exhaust restrictor to permit the exhaust air stream to flow through the bottom section of the exhaust duct; arranging the bottom supply restrictor to restrict the supply air stream from flowing through the bottom section of the supply duct; and arranging the top exhaust restrictor to restrict the exhaust air stream from flowing through the top section of the exhaust duct.

In yet another aspect, a heat exchanger for exchanging heat in a duct of a ventilation system comprises a heat pipe assembly configured to be installed in the ventilation system inside the duct such that heat is transferrable between the heat pipe assembly and air flowing through the duct. The heat pipe assembly includes a plurality of heat pipes extending vertically when the heat pipe assembly is installed in the duct. Each heat pipe has a height that is greater than about 36 inches (about 91 cm). A flow restrictor is configured to be installed in the ventilation system inside the duct. The flow restrictor is configured to substantially restrict the air flowing through the duct from flowing through a first section of the duct and allow passage of the air flowing through the duct through a second section of the duct. The heat pipe assembly is received in both the first section of the duct and the second section of the duct Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
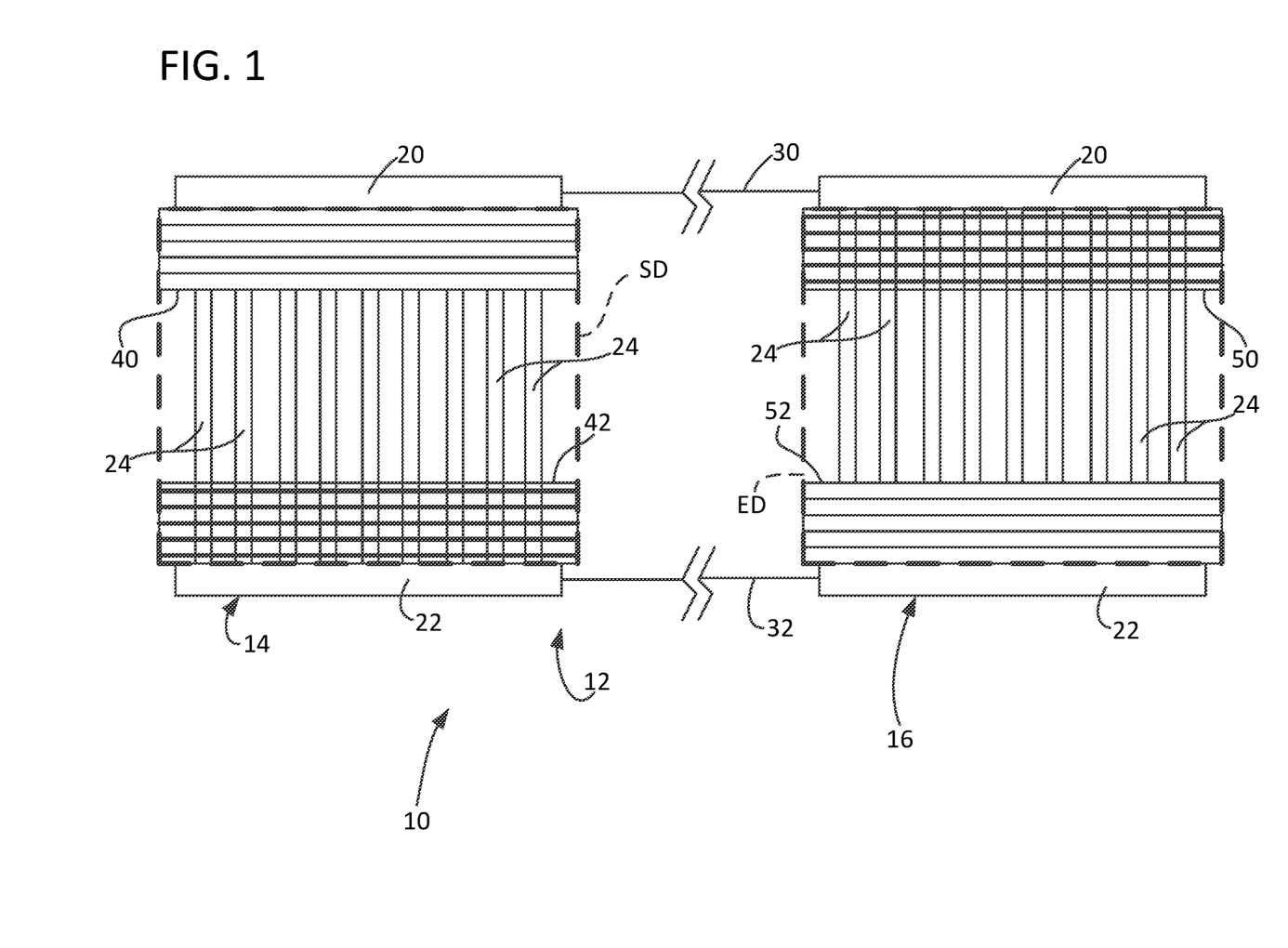
FIG. 1 is a schematic illustration of a heat exchanger installed in a ventilation system.

Referring to FIG. 1, one embodiment of a heat exchanger is generally indicated at reference number 10. The heat exchanger 10 is generally configured to provide heat recovery in a ventilation system of a forced air climate control system. For example, the illustrated heat exchanger 10 is thought to be suitably configured for providing heat recovery in a ventilation system that operates during the course of a year in both a cooling mode and a heating mode (e.g., a two-season climate control system). In the illustrated embodiment, the heat exchanger 10 is configured to provide heat recovery between a supply air duct SD (broadly, a first duct portion) and an exhaust air duct ED (broadly, a second duct portion). In general, the ducts SD, ED are configured to receive air streams SS, ES (FIGS. 3 and 4) of different temperatures (e.g., a warm air stream and a cool air stream). The heat exchanger 10 could also be used to provide heat recovery between other duct portions, such as first and second portions of a single inline duct at which the temperature of an air stream flowing through the duct is expected to differ. In the illustrated embodiment, the ducts SD, ED are arranged side-by-side such that the ducts are spaced apart along a horizontal axis and disposed at a common height along a vertical axis. The ducts can have other arrangements in other embodiments.

Figure 2:
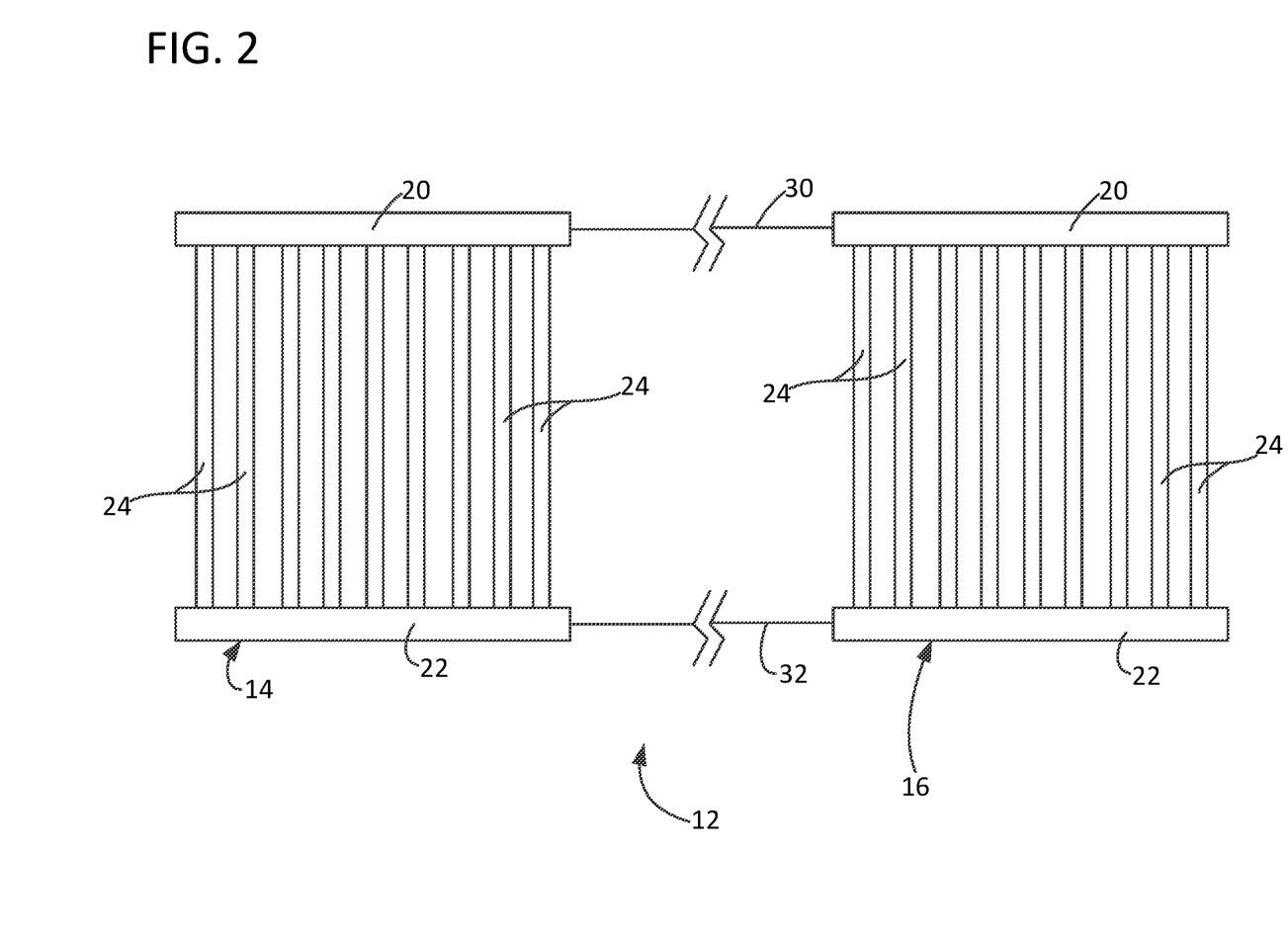
FIG. 2 is a schematic illustration of a heat pipe system of the heat exchanger.

Referring to FIG. 2, the heat exchanger 10 includes a heat pipe system, generally indicated at 12. The illustrated heat pipe system 12 comprises a supply heat pipe subassembly 14 (broadly, a first heat pipe subassembly) that is configured to be installed in the ventilation system in thermal communication with a supply air stream SS (FIG. 3) flowing through the supply duct SD and an exhaust heat pipe subassembly 16 (broadly, a second heat pipe subassembly) that is configured to be installed in the ventilation system in thermal communication with an exhaust air stream ES (FIG. 4) flowing through the exhaust duct ED. In the illustrated embodiment, each of the heat pipe subassemblies 14, 16 includes a heat pipe portion that is configured to be installed inside the respective duct SD, ED. Thus, the heat pipe portions of the subassemblies 14, 16 are configured to be in direct thermal contact with the air streams SS, ES as the air streams flow through the ducts SD, ED along the respective heat pipe portions. A heat pipe portion could also be installed in a ventilation system in thermal communication with an air stream flowing through a duct portion in other ways without departing from the scope of the invention.

Each of the heat pipe subassemblies 14, 16 comprises a top header 20, a bottom header 22, and a plurality of heat pipes 24 that extend vertically and provide fluid communication between the respective top header and the respective bottom header. Other configurations are also possible without departing from the scope of the invention. Each of the top and bottom headers 20, 22 can comprise a manifold having a main passage that is fluidly coupled to each of the heat pipes 24. In the illustrated embodiment, the top and bottom headers 20, 22 are located outside of the respective duct SD, ED. In other embodiments, the headers could be installed inside the duct with the vertical heat pipes.

Figure 3:
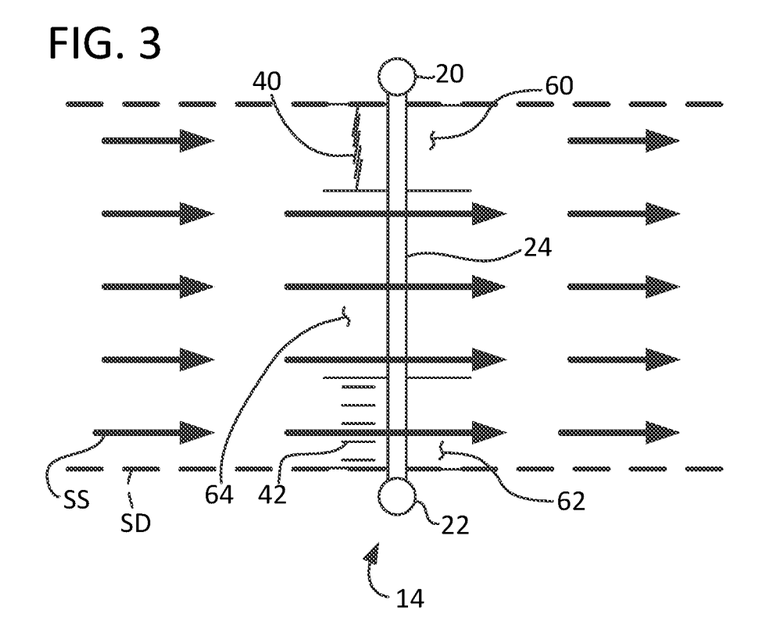
FIG. 3 is a schematic illustration of an evaporator portion of the heat exchanger installed in a first duct portion of the ventilation system and includes a schematic representation of air flow through the first duct portion.
Figure 4:
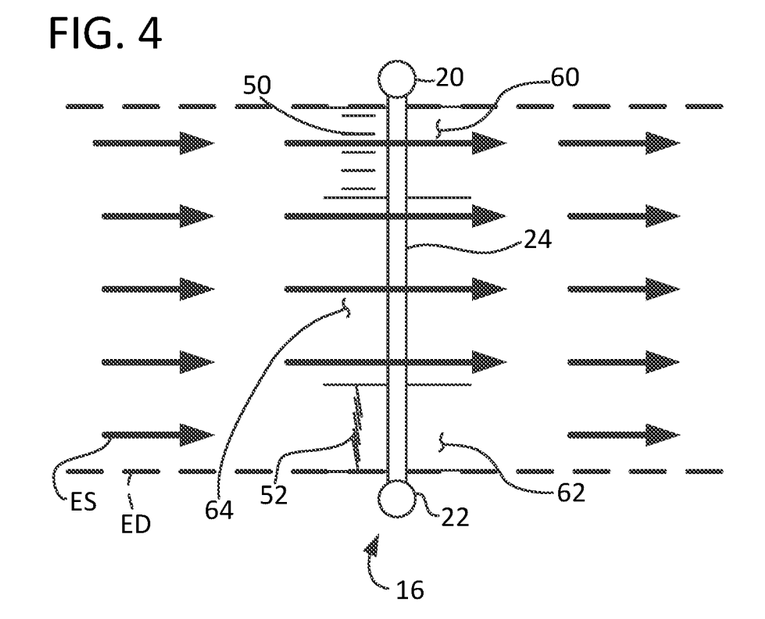
FIG. 4 is a schematic illustration of a condenser portion of the heat exchanger installed in a second duct portion of the ventilation system and includes a schematic representation of air flow through the second duct portion.

The vertical heat pipes 24 individually and collectively comprise heat pipe portions received in the respective duct SD, ED. In one or more embodiments, the vertical heat pipes 24 extend along an entirety of a height of the respective duct SD, ED and are spaced apart along a width of the respective duct. Two or more heat pipe subassemblies can also be vertically stacked inside a duct in some embodiments. In certain embodiments, the vertical heat pipes 24 have a height that is greater than about 36 inches (about 91 cm), such as greater than about 40 inches (about 102 cm), greater than about 45 inches (about 114 cm), greater than about 50 inches (about 127 cm), greater than about 55 inches (about 140 cm), greater than about 60 inches (about 152.4 cm), greater than about 65 inches (about 165 cm), greater than about 70 inches (about 178 cm), about 75 inches (about 191 cm), etc. The heat pipes can also have other heights in one or more embodiments. Accordingly, the air streams SS, ES can flow through the gaps between the heat pipes 24 as they flow through the respective ducts SD, ED. Referring to FIGS. 3 and 4, only a single row of vertical heat pipes 24 is shown in the illustrated embodiment. In other embodiments, however, a plurality of rows of heat pipes can be spaced apart in the direction of air flow through the respective duct. In certain embodiments, the vertical heat pipes in a plurality of rows of heat pipes can be offset from one another along the width of the duct. Additional rows of vertical heat pipes can be fluidly coupled to the same headers 20, 22 or to different headers (e.g., there can be a dedicated header for each row of heat pipes or for a set of two or more rows of heat pipes). In one or more embodiments, heat transfer fins (not shown) extend along the width of each duct SD, ED at spaced apart locations along the height of each duct such that the respective airstream SS, ES can flow through the gaps between the fins. Suitably, each fin can comprise a thin strip of thermally conductive material that is thermally and physically connected to one or more vertical heat pipes 24 in the respective duct SD, ED to transfer heat between the respective heat pipes and the respective air stream SS, ES.

The heat pipe system 12 is charged with a refrigerant that is suitable for the temperature range of the ventilation system in which the heat exchanger 10 is installed. Referring again to FIGS. 1 and 2, the supply heat pipe subassembly 14 is fluidly connected to the exhaust heat pipe subassembly 16 such that the refrigerant can flow through the heat pipe system 12 between the heat pipe subassemblies. More specifically, the illustrated heat pipe system 12 comprises a vapor conduit 30 that provides fluid communication between the top headers 20 of the heat pipe subassemblies 14, 16 and a liquid conduit 32 that provides fluid communication between the bottom headers 22 of the heat pipe subassemblies. The heat pipe system 12 thus defines a continuous refrigerant flow loop extending from the top header 20 of the supply heat pipe subassembly 14 in series through vapor conduit 30, the top header of the exhaust heat pipe subassembly 16, the heat pipes 24 of the exhaust heat pipe subassembly, the bottom header 22 of the exhaust heat pipe subassembly, the liquid conduit 32, the bottom header of the supply heat pipe subassembly, the heat pipes of the supply heat pipe subassembly, and back to the top header of the supply subassembly. Although the continuous refrigerant flow loop was described as proceeding in a clockwise direction through the passaging depicted in FIGS. 1 and 2, it will be understood that the refrigerant can also flow in the opposite direction.

Referring to FIG. 2, and as will be explained in further detail below, the heat pipe system 12 is configured so that either of the heat pipe subassemblies 14, 16 can function as an evaporator (e.g., an evaporator heat pipe subassembly) that is configured to evaporate liquid refrigerant while the other of the subassemblies functions as a condenser (e.g., a condenser heat pipe subassembly) that is configured to condense refrigerant vapor. As will be appreciated by those skilled in the art, the heat pipe subassembly 12 is configured to transfer heat from the warmer of the air streams SS, ES to the cooler of the air streams as the refrigerant in the heat pipe system 12 flows between the evaporator heat pipe subassembly 14, 16 and the condenser heat pipe subassembly. In general, heat from the warm air stream SS, ES is absorbed by evaporation of the refrigerant in the evaporator heat pipe subassembly 14, 16, thereby cooling the warm air stream and warming the refrigerant. The warm, evaporated refrigerant flows through the top header 20 of the evaporator heat pipe subassembly 14, 16 and through the vapor conduit 30 to the condenser heat pipe subassembly. In the condenser heat pipe subassembly 14, 16, the cool air stream SS, ES flows along the heat pipes 24 and condenses the warm refrigerant vapor. Condensation of the refrigerant transfers heat to the cool air stream SS, ES, thereby warming the air stream and cooling the refrigerant. The cool, condensed refrigerant flows along the liquid conduit 32 back to the evaporator heat pipe subassembly. This heat recovery cycle can, in certain embodiments, continue passively in a closed loop.

Heat transfer between the air streams SS, ES and the heat exchanger 10 is greatest at locations where refrigerant phase change is occurring. Evaporation in the evaporator heat pipe subassembly 14, 16 absorbs heat from the respective air stream SS, ES and condensation in the condenser heat pipe subassembly releases heat into the other air stream. Heat exchange between the heat pipe subassemblies 14, 16 and the air streams SS, ES is maximized at locations along the heights of the heat pipes 24 where evaporation or condensation is occurring. Heat exchange may be substantially reduced where no evaporation or condensation is occurring. In the embodiment where heat pipe subassembly 14 is the evaporator heat pipe assembly and heat pipe subassembly 16 is the condenser heat pipe assembly, heat exchange is maximized generally at the bottom and middle portions of the evaporator heat pipe subassembly 14 and at the top and middle portions of the condenser heat pipe subassembly 16, as will be explained in further detail below.

In the illustrated embodiment, the supply subassembly 14 and the exhaust subassembly 16 are located at about the same height and the vapor conduit 30 and the liquid conduit 32 each extend generally horizontally. Accordingly, in the illustrated heat pipe system 12, refrigerant is configured to flow passively between the subassemblies 14, 16 and is not gravity driven. In other embodiments, the heat pipe system can be arranged so that refrigerant flow between the subassemblies is gravity-assisted (e.g., by orienting the liquid conduit to slope toward the subassembly functioning as an evaporator). In addition, a pump can be used to drive refrigerant flow through the heat pipe system in certain embodiments.

Regardless of the mode by which refrigerant is driven through a heat pipe loop, because of gravity, liquid refrigerant tends to flow toward the bottom end of the heat pipe system 12 and vaporized refrigerant tends to flow toward the top end of the heat pipe system. As a result, refrigerant vapor may collect in the top segments of the heat pipes 24 (as well as in the top headers 20 and the vapor conduit 30); and similarly, liquid may collect in the bottom segments of the heat pipes (as well as in the bottom headers 22 and the liquid conduit 32). In the evaporator heat pipe subassembly 14, 16, the refrigerant vapor that collects in the top segments of the heat pipes 24 can cause diminished heat transfer at the top segments of the heat pipes in comparison with the bottom and middle segments of the heat pipes where liquid refrigerant that may be evaporated is present. Similarly, in the condenser subassembly 14, 16, the liquid refrigerant that collects in the bottom segments of the heat pipes 24 can cause diminished heat transfer at the bottom segments of the heat pipes in comparison with the top and middle segments of the heat pipes where refrigerant vapor that may be condensed is present. As explained below, the illustrated heat exchanger 10 is generally configured to selectively restrict air flow through low heat-transfer sections of the ducts SD, ED that are aligned with segments of the heat pipes 24 in which collected refrigerant vapor or liquid refrigerant may reduce heat transfer capacity. Restricting air flow in this manner is thought to maximize the amount of the air streams SS, ES that flows along the segments of the heat pipes 24 where heat transfer potential may be greater because more evaporation or condensation may be possible.

Referring to FIG. 1, the illustrated heat exchanger 10 includes a plurality of adjustable dampers 40, 42, 50, 52 (broadly, adjustable flow restrictors or, more generally, flow restrictors) that are configured to be installed in the ducts SD, ED for selectively restricting the respective air streams SS, ES from flowing through respective sections of the ducts. Other types of adjustable flow restrictors (e.g., gate valves) or static flow restrictors (e.g., one or more fixed plates, or an enclosure) could also be used in other embodiments. In the illustrated embodiment, the heat exchanger 10 comprises a top supply damper 40 installed in the top section of the supply duct SD, a bottom supply damper 42 installed in the bottom section of the supply duct, a top exhaust damper 50 installed in the top section of the exhaust duct ED, and a bottom exhaust damper 52 installed in the bottom section of the exhaust duct. The middle sections of the ducts SD, ED are substantially free of any structure (besides the respective heat pipes 24 and thermal fins) that restricts flow through the middle sections. Each heat pipe 24 includes a respective segment that is received in the top section, the middle section, and the bottom section of the respective duct SD, ED, as delimited by the respective dampers 40, 42, 50, 52. Other embodiments (some of which are described in reference to FIGS. 5 and 6 below), can comprise other arrangements of dampers without departing from the scope of the invention. For example, when multiple heat pipe subassemblies are stacked vertically in a single duct, adjustable dampers can be arranged in operative alignment with the top segment and/or bottom segment of one or more the heat pipe subassemblies in the stack (e.g., a damper can be located at a middle section of the duct that is operatively aligned with a top segment of a bottom heat pipe subassembly or a bottom segment of a top heat pipe subassembly, etc.).

Each damper 40, 42, 50, 52 comprises a frame (e.g., a support) configured to mount the damper in the respective duct SD, ED in operative alignment with a respective section of the respective duct SD, ED. Referring to FIGS. 3 and 4, the frame of each of the top dampers 40, 50 defines a top plenum 60 (broadly, a top section) of the respective duct SD, ED, and the frame of each of the bottom dampers 42, 52 defines a bottom plenum 62 (broadly, a bottom section) of the respective duct that is spaced apart from the respective top plenum. The top and bottom dampers 40, 42, 50, 52 in each duct SD, ED define a middle flow plenum 64 (broadly, a middle section) between the top and bottom plenums. In one embodiment, the frames of the dampers 40, 42, 50, 42 define respective plenums 60, 62, 64 that extend from respective upstream ends spaced apart upstream of the heat pipes 24 of the respective heat pipe subassembly 14, 16 to respective downstream ends spaced apart downstream of the heat pipes of the respective heat pipe subassembly. As will be explained in further detail below, the adjustable dampers 40, 42, 50, 52 are configured to selectively restrict air flow through the plenums defined by their frames. In other embodiments, the frames of the adjustable dampers could have other configurations, e.g., the frames could define plenums that are located entirely upstream of the respective heat pipes.

In general, the adjustable dampers 40, 42, 50, 52 are selectively openable to allow passage of the air streams SS, ES through the respective plenums and are selectively closable to restrict air flow through the respective plenums. Referring still to FIGS. 3 and 4, in the illustrated embodiment, each damper 40, 42, 50, 52 includes a plurality of damper plates that are selectively pivotable about respective horizontal axes between an open configuration (e.g., the bottom supply damper 42 and the top exhaust damper 50) and a closed configuration (e.g., the top supply damper 40 and the bottom exhaust damper 52). In one embodiment, the dampers 40, 42, 50, 52 are manually adjustable between the open and closed configurations; in another embodiment, the dampers include one or more actuators (not shown) that are configured to drive movement of the damper plates to open and close the dampers. For example, the heat exchanger 10 can include a controller (not shown) that is configured to automatically direct the actuators to open and close the dampers based on which of the air streams SS, ES has a greater temperature or the mode of operation (e.g., cooling mode, heating mode) of the ventilation system.

In the closed configuration of each damper 40, 42, 50, 52, the damper plates form a flow restrictor that is arranged to restrict air from flowing through the respective plenum 60, 62. In one or more embodiments, each of the flow restrictors provided by the closed dampers 40, 42, 50, 52 extends along substantially an entirety of a width of the respective duct SD, ED and extends along only a partial segment that is less than an entirety of the height of the respective duct. For example, the flow restrictors may extend along about ⅓ of the height of the respective duct. In another embodiment, the flow restrictors may extend along about ¼ of the height of the respective duct. When closed, each damper 40, 42, 50, 52 is configured to substantially restrict the respective air stream SS, ES from flowing along segments of the heat pipes 24 that are received in the respective plenum 60, 62. In contrast, when each damper 40, 42, 50, 52 is open, gaps are provided between the damper plates, and the respective air stream SS, ES can flow through the gaps and through the respective plenum 60, 62. Thus, in the open configuration of each damper 40, 42, 50, 52, the respective airstream SS, ES can flow along the segments of the heat pipes 24 that are received in the respective plenum 60, 62. In the illustrated embodiment, the damper plates of the dampers 40, 42, 50, 52 when the damper is closed is located directly upstream from the segments of the heat pipes 24 that are received in the respective plenum 60, 62. In other embodiments, adjustable damper plates can also be included at a location downstream from the heat pipes. Still other adjustable and static flow restrictor arrangements are also possible without departing from the scope of the invention.

In one embodiment, during use, the top damper 40, 50 is opened when the respective heat pipe subassembly 14, 16 is functioning as a condenser (e.g., when the respective air stream SS, ES comprises a cool air stream) and the top damper is closed when the respective heat pipe subassembly is functioning as an evaporator (e.g., when the respective air stream comprises a warm air stream). Conversely, the bottom damper 42, 52 is closed when the respective heat pipe subassembly 14, 16 is functioning as a condenser (e.g., when the respective air stream SS, ES comprises a cool air stream) and the bottom damper is opened when the respective heat pipe subassembly is functioning as an evaporator (e.g., when the respective air stream comprises a warm air stream).

When a heat pipe subassembly 14, 16 is functioning as a condenser, the air stream SS, ES flowing through the respective duct SD, ED comprises a cool air stream. Opening the top damper 40, 50 when the respective heat pipe subassembly 14, 16 is functioning as a condenser allows the respective cool air stream to flow through the respective top plenum 60 along the top segments of the that heat pipes 24, which contain warm, condensable refrigerant vapor. Heat is transferred from the warm refrigerant vapor in the top segments and middle segments of the heat pipes 24 to the respective cool air stream SS, ES, thus condensing the refrigerant vapor. Closing the bottom damper 42, 52 when the respective heat pipe subassembly 14, 16 is functioning as a condenser restricts the respective air stream SS, ES from flowing through the bottom plenum 62 across the bottom segments of the heat pipes 24, which contain collected condensed liquid refrigerant that is not capable of transferring heat to the air stream by condensation. Thus, when the respective heat pipe subassembly 14, 16 is functioning as a condenser, opening the respective top damper 40, 50 and closing the respective bottom damper directs substantially all of the cool air stream SS, ES flowing through the respective duct SD, ED to flow across the condenser heat pipe subassembly along the middle and upper segments of the heat pipes 24, where condensation of the refrigerant is most likely to occur, and substantially restricts the air stream from flowing along the bottom segments of the heat pipes where condensation is less likely to occur.

When a heat pipe subassembly 14, 16 is functioning as an evaporator, the air stream SS, ES flowing through the respective duct SD, ED comprises a warm air stream. Closing the respective top damper 40, 50 when the heat pipe subassembly 14, 16 is functioning as an evaporator restricts the respective air stream SS, ES from flowing through the top plenum 60 along the top segments of the heat pipes 24, which contain collected refrigerant vapor that is not capable of absorbing heat from the air stream by evaporation. In contrast, opening the bottom damper 42, 52 allows the respective warm air stream SS, ES to flow through the respective bottom plenum 62 across the bottom segments of the that heat pipes 24, which contain cool, liquid refrigerant that can absorb heat by evaporation. Heat is thus transferred from the warm air stream ES, SS to the bottom segments and middle segments of the heat pipes 24, thereby evaporating the liquid refrigerant in the bottom and middle segments. Thus, when the respective heat pipe subassembly 14, 16 is functioning as an evaporator, opening the respective bottom damper 42, 52 and closing the respective top damper 40, 50 directs substantially all of the warm air stream SS, ES flowing through the respective duct SD, ED to flow across the heat pipe subassembly along the middle and bottom segments of the heat pipes 24, where evaporation of the refrigerant is most likely to occur, and substantially restricts the warm air stream from flowing along the top segments of the heat pipes where evaporation is less likely to occur.

A method of using the heat exchanger 10 in a two-season ventilation system will now be described. In a two-season ventilation system, when the ventilation system switches to a cooling mode, the supply heat pipe subassembly 14 functions as an evaporator and the exhaust heat pipe subassembly 16 functions as a condenser. Thus, when the two-season ventilation system switches to a cooling mode, the top damper 40 in the supply duct SD is closed and the bottom damper 42 in the supply duct is opened (as shown in FIG. 3) and the top damper 50 of the exhaust duct ED is opened and the bottom damper 52 of the exhaust duct is closed (as shown in FIG. 4). When the ventilation system switches to a heating mode, the supply heat pipe subassembly 14 functions as a condenser and the exhaust heat pipe subassembly 16 functions as an evaporator. Thus, the top damper 40 in the supply duct SD is opened and the bottom damper 42 in the supply duct is closed and the top damper 50 in the exhaust duct ED is closed and the bottom damper 52 in the exhaust duct is opened as shown in FIG. 4.

In a ventilation system that operates full-time in the heating mode, static flow restrictors could be used in the position(s) of one or more of the closed dampers in the heating mode of the two-season ventilation system described above. Likewise, in a ventilation system that operates full-time in the cooling mode, static flow restrictors could be used in the position(s) of one or more of the closed dampers in the cooling mode of the two-season ventilation system described above.

Figure 5:
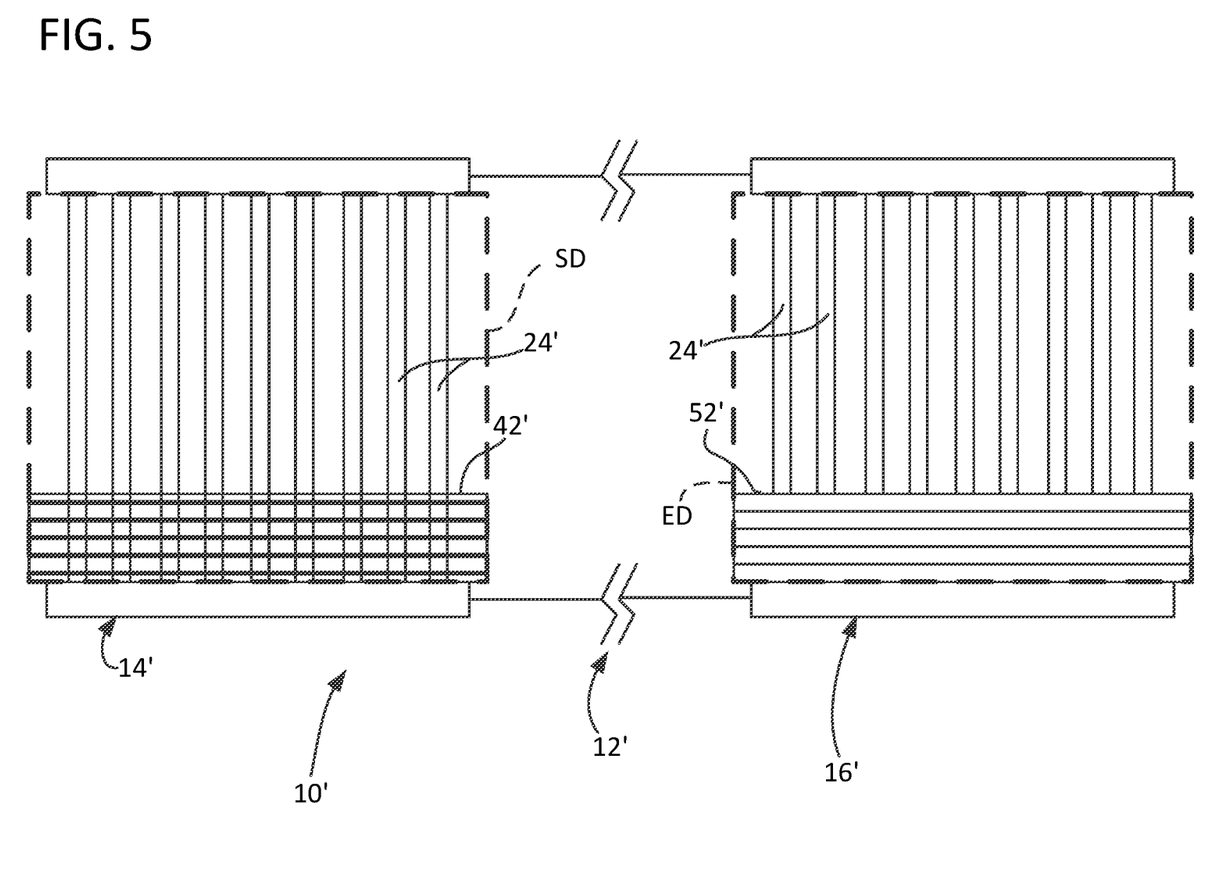
FIG. 5 is a schematic illustration of another embodiment of a heat exchanger installed in the ventilation system.

Referring to FIG. 5, another embodiment of a heat exchanger is generally indicated at reference number 10'. The heat exchanger 10' is substantially identical to the heat exchanger 10, and corresponding parts are given corresponding reference numbers, plus a prime symbol. In comparison with the heat exchanger 10, the heat exchanger 10' includes a substantially identical heat pipe system 12' comprising heat pipe assemblies 14', 16' that are configured to be installed in the supply duct SD and the exhaust duct ED such that vertical heat pipes 24' of each subassembly are received inside the respective duct. In addition, the heat exchanger 10' comprises bottom adjustable dampers 42', 52' that are substantially identical to the bottom adjustable dampers 42, 52 described above. Unlike the heat exchanger 10, however, the heat exchanger 10' does not include top adjustable dampers. Thus, the heat exchanger 10' is a simplified system with fewer components than the heat exchanger 10. In a two-season ventilation system, the bottom adjustable dampers 42', 52' can be used in the same manner as described above for the bottom adjustable dampers 42, 52 of the heat exchanger 10.

Figure 6:
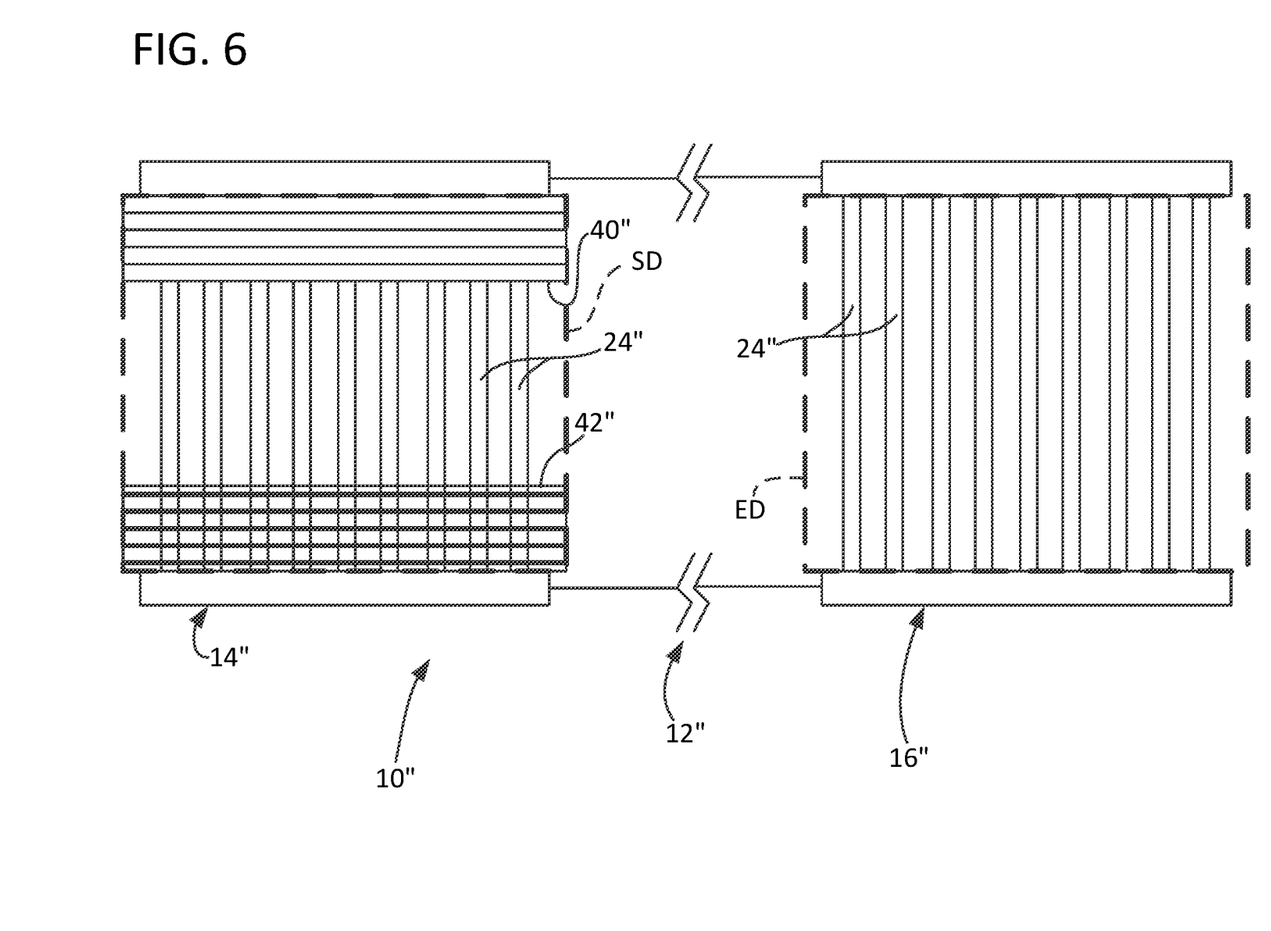
FIG. 6 is a schematic illustration of another embodiment of a heat exchanger installed in the ventilation system.

Referring to FIG. 6, another embodiment of a heat exchanger is generally indicated at reference number 10". The heat exchanger 10" is substantially identical to the heat exchanger 10, and corresponding parts are given corresponding reference numbers, plus a double-prime symbol. In comparison with the heat exchanger 10, the heat exchanger 10" includes a substantially identical heat pipe system 12" comprising heat pipe assemblies 14", 16" that are configured to be installed in the supply duct SD and the exhaust duct ED such that vertical heat pipes 24" of each subassembly are received inside the respective duct. In addition, the heat exchanger 10" comprises top and bottom adjustable dampers 40", 42" that are operatively aligned with the first heat pipe subassembly 14". The top and bottom dampers 40", 42" can have any of the features of the dampers 40, 42 described above. Unlike the heat exchanger 10, the heat exchanger 10" does not include adjustable dampers that are operatively aligned with the second heat pipe subassembly 16". Thus, the heat exchanger 10" is a simplified system with fewer components than the heat exchanger 10. In the illustrated embodiment, the dampers 40", 42" are located in only the supply duct SD and not the exhaust duct ED. In a two-season ventilation system, the adjustable dampers 40", 42" can be used in the same manner as described above for the adjustable dampers 40, 42 of the heat exchanger 10. In one or more embodiments, the top and bottom dampers can be included in only the exhaust duct; and in these embodiments, the dampers could be used in the same manner as described of the adjustable dampers 50, 52 in a two-season ventilation system. In further embodiments, it is contemplated that the heat exchanger can have only a single adjustable damper (e.g., a single adjustable damper that is operatively aligned with the top segment or the bottom segment of a heat pipe subassembly in a supply duct, in an exhaust duct, or in another duct portion). In a two-season ventilation system, a single damper can be used in the same manner as described above for the adjustable damper 40, 42, 50, 52 at the corresponding position in the heat exchanger 10.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A method of recovering heat in a ventilation system having a supply duct and an exhaust duct, the ventilation system operating in a heating mode, the method comprising:
    permitting a supply air stream in the supply duct to flow through a top section of the supply duct in which a top segment of a supply heat pipe portion is received;
    restricting the supply air stream in the supply duct from flowing through a bottom section of the supply duct in which a bottom segment of a supply heat pipe portion is received; and
    restricting the exhaust air stream in the exhaust duct from flowing through a top section of the exhaust duct in which a top segment of an exhaust supply heat pipe portion is received.

2. A method of recovering heat in a ventilation system having a supply duct and an exhaust duct, the ventilation system operating in a heating mode, the method comprising:
    permitting a supply air stream in the supply duct to flow through a top section of the supply duct in which a top segment of a supply heat pipe portion is received;
    restricting the supply air stream in the supply duct from flowing through a bottom section of the supply duct in which a bottom segment of a supply heat pipe portion is received;
    permitting an exhaust air stream in the exhaust duct to flow through a bottom section of the exhaust duct in which a bottom segment of an exhaust supply heat pipe portion is received; and restricting the exhaust air stream in the exhaust duct from flowing through a top section of the exhaust duct in which a top segment of an exhaust supply heat pipe portion is received.

3. A method of recovering heat in a ventilation system having a supply duct and an exhaust duct, the ventilation system operating in a heating mode, the method comprising:
permitting an exhaust air stream in the exhaust duct to flow through a bottom section of the exhaust duct in which a bottom segment of an exhaust heat pipe portion is received;
restricting the exhaust air stream in the exhaust duct from flowing through a top section of the exhaust duct in which a top segment of an exhaust heat pipe portion is received; and
restricting a supply air stream in the supply duct from flowing through a bottom section of the supply duct in which a bottom segment of a supply heat pipe portion is received.

4. A method of recovering heat in a ventilation system having a supply duct and an exhaust duct, the ventilation system operating in a heating mode, the method comprising:
permitting an exhaust air stream in the exhaust duct to flow through a bottom section of the exhaust duct in which a bottom segment of an exhaust heat pipe portion is received; and
restricting the exhaust air stream in the exhaust duct from flowing through a top section of the exhaust duct in which a top segment of an exhaust heat pipe portion is received;
permitting a supply air stream in the supply duct to flow through a top section of the supply duct in which a top segment of a supply heat pipe portion is received; and
restricting the supply air stream in the supply duct from flowing through a bottom section of the supply duct in which a bottom segment of a supply heat pipe portion is received.

* * * * *